United States Patent
Valentine et al.

[11] Patent Number: 5,924,027
[45] Date of Patent: Jul. 13, 1999

[54] BEST-CHANCE ROUTING

[75] Inventors: Eric Valentine, Plano; Vladimir Alperovich, Dallas, both of Tex.

[73] Assignee: Ericsson Inc., Research Triangle Park, N.C.

[21] Appl. No.: 08/752,255

[22] Filed: Nov. 19, 1996

[51] Int. Cl.$^6$ ........................................ H04Q 7/22
[52] U.S. Cl. .................................................. 455/417
[58] Field of Search ...................... 455/417, 456

[56] References Cited

U.S. PATENT DOCUMENTS

| | | | |
|---|---|---|---|
| 5,329,578 | 7/1994 | Brennan et al. | 379/88.19 |
| 5,506,888 | 4/1996 | Hayes et al. | 455/417 |

FOREIGN PATENT DOCUMENTS

| | | |
|---|---|---|
| 0 260 763 A2 | 9/1987 | European Pat. Off. . |
| 0 613 280 A1 | 2/1994 | European Pat. Off. . |
| 0 656 717 A1 | 11/1994 | European Pat. Off. . |
| WO 94/29994 | 12/1994 | WIPO . |

*Primary Examiner*—Andrew M. Dollnar
*Attorney, Agent, or Firm*—Jenkens & Gilchrist

[57] ABSTRACT

An improved cellular communications system and method is disclosed which routes incoming calls to those subscribers who do not answer their page. The incoming call is routed to one of a list of alternate numbers, such as a home or work number in a public telephone system. Based upon the last known location of the subscriber within the cellular system, a particular list of such alternate numbers are tried in an effort to contact the subscriber outside the cellular network. Different lists are utilized depending upon the subscriber's last known location. In a first embodiment of the present invention, the various lists are stored in a home location register for the cellular system which forwards a particular list to the mobile switching center servicing the subscriber. In a second embodiment of the present invention, the particular list is stored within and forwarded by a service control point within an intelligent network.

14 Claims, 3 Drawing Sheets

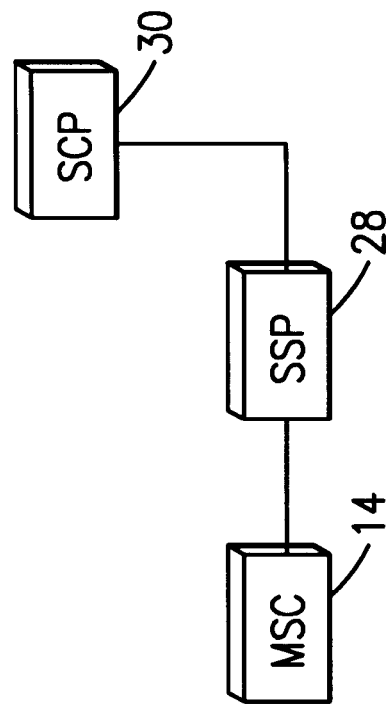
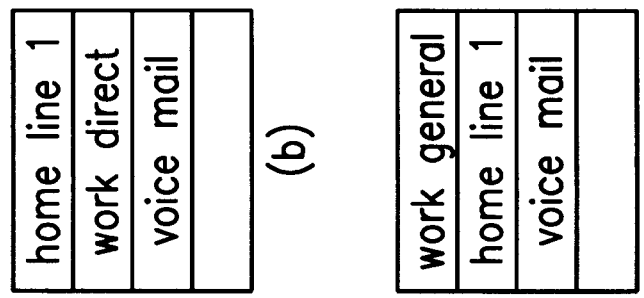
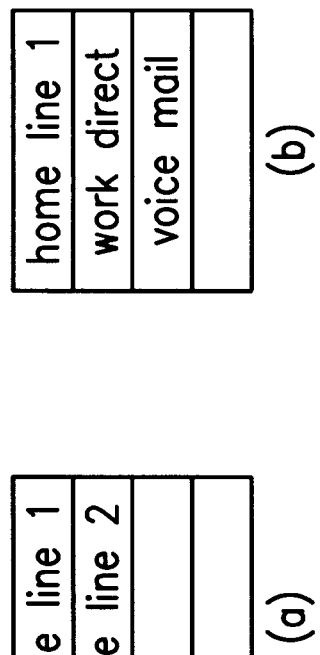
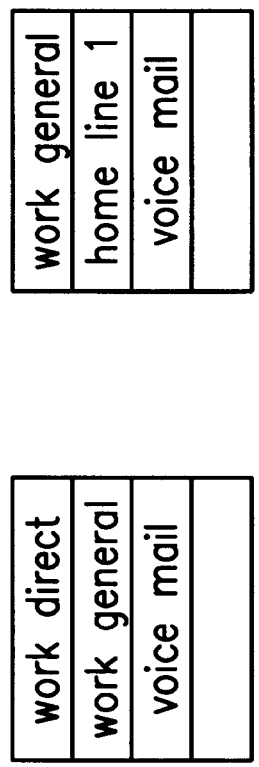
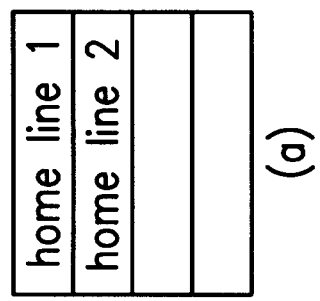
FIG. 4
FIG. 3

BEST-CHANCE ROUTING

BACKGROUND OF THE INVENTION

1. Field of the Invention

The present invention relates generally to a telecommunications system and method for improved routing of a subscriber's incoming calls, particularly to a telecommunications system and method for keeping track of the location of a subscriber within the telecommunications system and routing an incoming call for that subscriber to that location, and, more particularly, to a system and method for routing a cellular subscriber's incoming call to the non-cellular number offering the best-chance for locating the subscriber.

2. Background and Objects of the Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Currently, there exist services, such as a Single Personal Number (SPN) service, where alternative numbers are tried when attempts to locate a cellular subscriber within a network fail. For example, if the subscriber does not answer (or is unreachable) on their cellular phone, the telecommunications system then forwards the call through the Public Switched Telephone Network (PSTN) or the Integrated Service Digital Network (ISDN) to an alternate non-cellular number for that subscriber, e.g., their residence or work number, in a further effort to contact them. Similarly, a further failure to contact the subscriber may initiate a call to a third number, e.g., voice mail, and so forth. For example, a particular series of numbers used by an SPN system may indicate a series of attempts at (1) the subscriber's mobile phone number, (2) then the subscriber's work number, and (3) finally the subscriber's voice mail number at work.

The problem with such in seriatim SPN listings, however, is their lack of flexibility and adaptation to actual uses. For example, after the subscriber has gone home for the evening, the above fixed SPN sequence of numbers, for use on contacting the subscriber at work, is no longer useful for reaching the subscriber. Instead, the call may be forwarded to voice mail at work, and the subscriber may not learn about the call for days. It is, accordingly, readily apparent that a more flexible approach is necessary to best route a given incoming call in a cellular system to a given unanswering subscriber at their most likely current cellular or non-cellular telephone number or location, which may vary during the day.

It is, accordingly, an object of the present invention to route incoming calls to unanswering cellular subscribers in an SPN service utilizing a flexible protocol.

It is a further object of the present invention to keep track of the last known location of the SPN subscriber within the telecommunications system and route the incoming calls to those numbers associated with the last known location which have the best chance of reaching the subscriber pursuant to the flexible protocol.

SUMMARY OF THE INVENTION

The present invention is directed to an improved cellular communications system and method for routing incoming calls to those subscribers who do not answer their page. The incoming call is routed to a list of alternate numbers, such as a home or work number in a public telephone system. Based upon the last known location of the subscriber within the cellular system, a particular list of such alternate numbers are tried in an effort to contact the subscriber outside the cellular network. Different lists are utilized depending upon the subscriber's last known location. In a first embodiment of the present invention, the various lists are stored in a home location register for the cellular system which forwards a particular list to the mobile switching center servicing the subscriber. In a second embodiment of the present invention, the particular list is stored within and forwarded by a service control point within an intelligent network.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 3 illustrates the respective contents of several lists constructed in accordance with the present invention; and FIG. 4 illustrates a second embodiment of the present invention.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
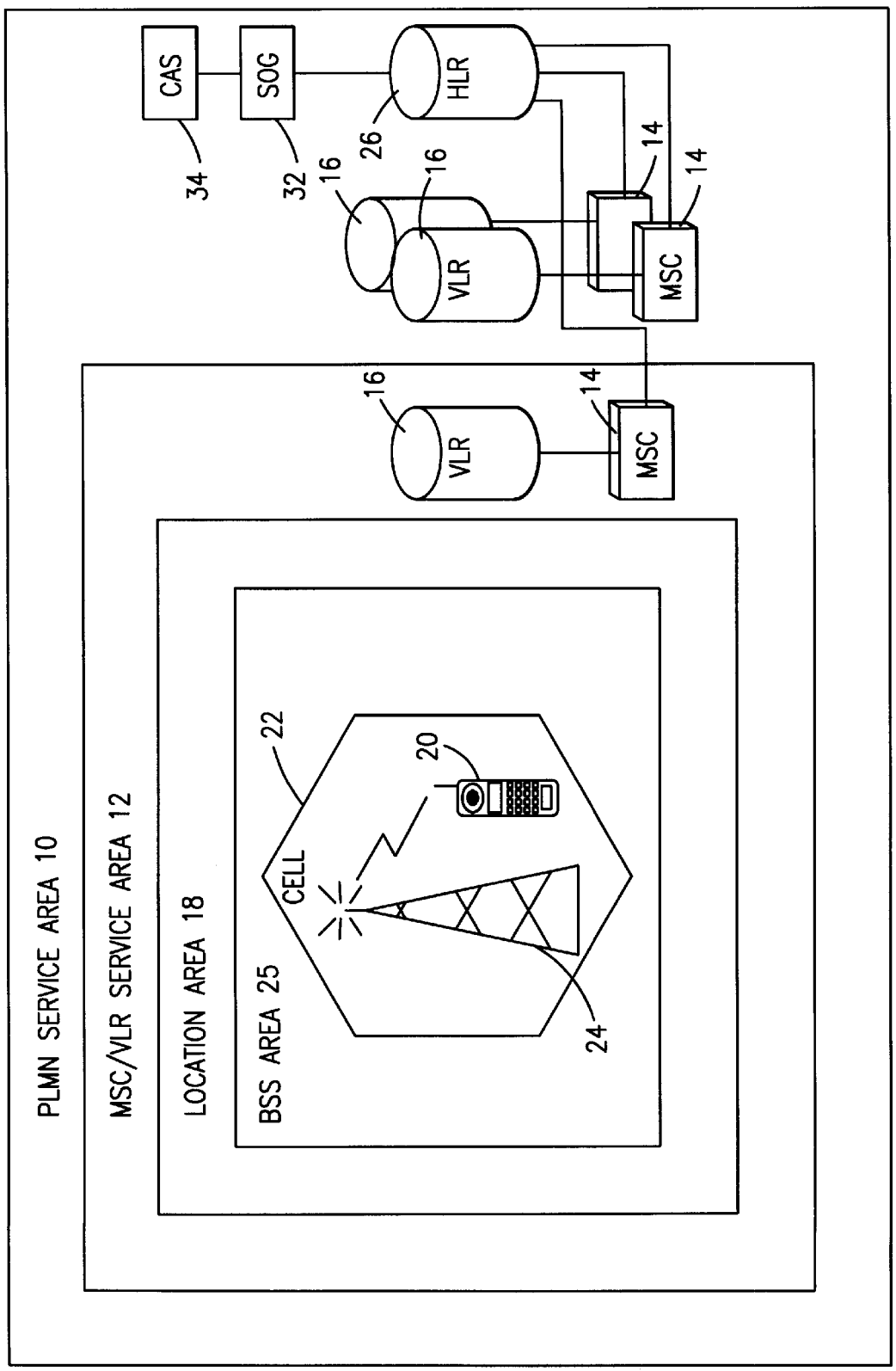
FIG. 1 illustrates a cellular network and components therein which utilize the improved routing system and method in accordance with a first embodiment of the present invention.

With reference to FIG. 1 of the drawings, there is illustrated a Public Land Mobile Network (PLMN), such as cellular network 10, which in turn is composed of a plurality of areas 12, each with a Mobile Switching Center (MSC) 14 and a Visitor Location Register (VLR) 16, which is preferably associated therewith. The MSC/VLR areas 12, in turn, include a plurality of Location Areas (LA) 18 therein, which are defined as that portion of a given MSC/VLR area 12 in which a mobile station (MS) 20 therein may move freely without having to forward update location information to the MSC/VLR area 12 that controls that LA 18. Each Location Area 18 is divided into a number of cells 22. Mobile station 20 is the physical equipment, e.g., a car phone or other portable phone, used by mobile subscribers to communicate with the cellular network 10. A Base Station (BS) 24 is the physical equipment, illustrated in FIG. 1 as an antenna, that provides radio coverage to the geographical area of the cell 22 in which to handle radio traffic to and from the MS 20.

With further reference to FIG. 1, the PLMN Service Area or cellular network 10 includes a Home Location Register (HLR) 26, which is a database maintaining all subscriber information, e.g., user profiles, current location and routing information, and other administrative information. The HLR 26 may be co-located with a given MSC 14, an integral part of the MSC 14 or service multiple MSCs 14, the latter of which is illustrated in FIG. 1.

The VLR 16 is a database containing information about all of the mobile stations 20 currently located within the MSC/VLR area 12. If a mobile station 20 roams into a new MSC/VLR area 12, the VLR 16 connected to that MSC 14 will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26.

In the aforesaid manner, the VLR and HLR databases 16 and 26, respectively, contain various subscriber information associated with a given mobile station 20. In one embodiment of the present invention, additional information for each subscriber is stored in these databases, particularly, the aforementioned Single Personal Number (SPN) service information, i.e., one or more alternate numbers to call when the subscriber does not answer a cellular page.

As discussed, however, a fixed sequence of alternate or default numbers tried in seriatim does not take into account the subscriber's pattern of activity, particularly, their last known location. Through use of a last known location variable and a list of alternate numbers corresponding thereto, the system and method of the present invention is better able to contact a subscriber unwilling or unable to communicate through the subscribed system.

Figure 2:
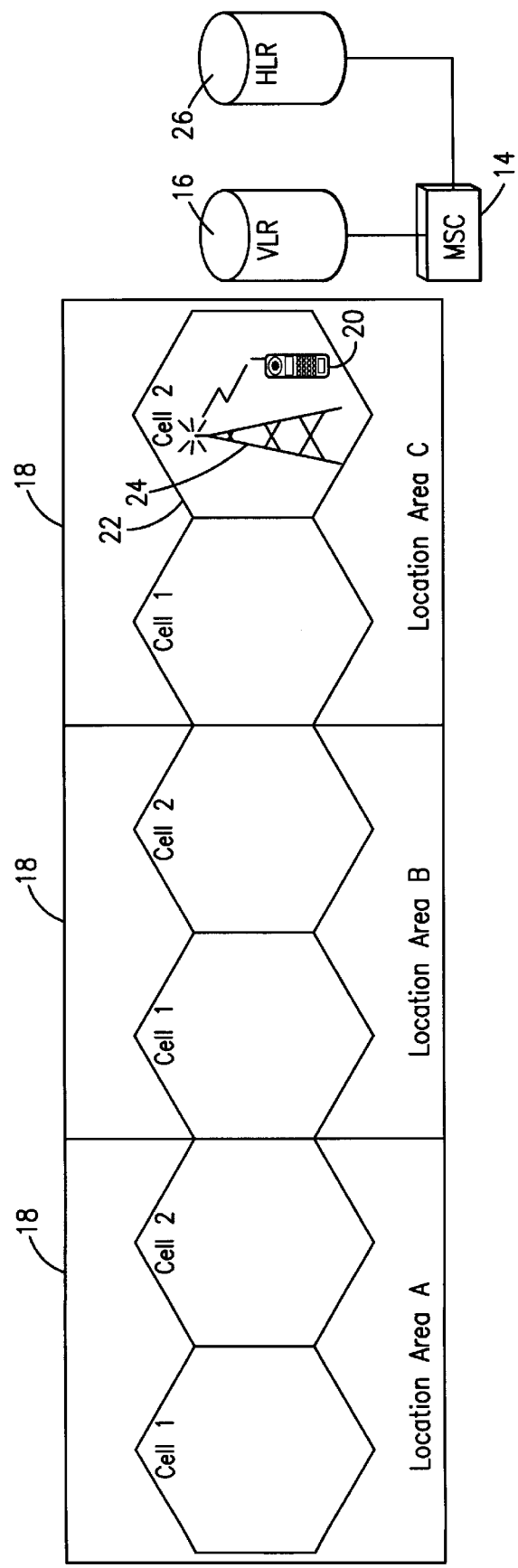
FIG. 2 illustrates a portion of the cellular network shown in FIG. 1.

With reference now to FIG. 2, there is shown a portion of the overall network 10 in FIG. 1, particularly, a portion of an MSC/VLR area 12 therein, and more particularly, a series of Location Areas 18, labeled A, B and C, each having discrete cells 1 and 2 therein. For example, with further reference to FIG. 2, a particular subscriber's residence is located within Location A, cell 1, and the subscriber's business or place of work is located within Location C, cell 2. Therebetween lies Location B within the MSC/VLR area 12.

According to a first embodiment of the present invention, the last known location of cellular use by the subscriber, who is now not answering or is unreachable on a cellular system, is stored within the MSC 14/VLR 16, e.g., within the VLR 16, and a preferred list of alternate numbers in the PSTN corresponding to that geographic location consulted. For example, if the last contact with the subscriber was in Location Area A, i.e., in the proximity of home in cell 1 therein, then the most likely point of contact with the subscriber is their home or other numbers thereabout which may be included in the list. Similarly, if the last contact was near work, i.e., in Location Area C, cell 2, then the work number would be the most likely PSTN number to use offering the best chance for contact. As discussed, additional default numbers can be added.

It is, accordingly, readily apparent that a single default PSTN number, or particular ordered list thereof, does not provide a best-chance scenario for subscriber contact under various conditions. In the first embodiment of the present invention, a multiplicity of lists of non-cellular or PSTN numbers are maintained in the HLR 26, each list corresponding to a particular geographical region covered by the cellular system. For example, with reference again to the simplified scenario in FIG. 2, i.e., a subscriber living in Location Area A, cell 1 and working in Location Area C, cell 2, if the last known location for the cellular subscriber was in Location Area A, i.e., near home, then the list of alternate numbers in HLR 26 would include the home PSTN number and any other local PSTN numbers, such as a second line in the home, to try if the first line is busy or there is no answer.

In like manner, a list containing one or more PSTN numbers for work would be associated with the last known subscriber location being in Location C. In the situation where the last known location was in Location Area B, i.e., between home and work, a selected protocol can be chosen to optimize contact chances. For example, a list containing the PSTN work number as the first element and the PSTN home number as the second. Other potential contact numbers could follow as additional defaults. Similarly, if the last known location was in any other area, i.e., outside the areas A, B and C shown in FIG. 2, then another protocol can be followed, e.g., home first then work, etc.

It should be understood, however, that although the aforedescribed example illustrates the situation of Location Area separation between the disparate choices, other levels of granularity may be employed. For example, if the subscriber's home and work place are in the same Location Area, i.e., Location Area A in FIG. 2, but in different cells therein, e.g., home in cell 1 and work in cell 2, then the aforedescribed list differentiation may be employed at the cell level of granularity. It should, accordingly, be understood that the aforedescribed lists may be utilized at even finer levels of granularity, e.g., at the microcell level, or at coarser levels, e.g., between MSC/VLR Service Areas 12 within the PLMN Service Area 10, or in combinations thereof with the above examples.

According to this first embodiment, the HLR 26 forwards, such as in a conventional insert subscriber data command using conventional Mobile Application Part (MAP) signaling, the appropriate alternate or backup number list associated with the last known location of the cellular or mobile subscriber to the MSC 14 servicing the subscriber.

In practice, after a certain period of time or a given number of rings or attempts to contact the subscriber through their cellular phone, the MSC 14 consults the first element within the list downloaded from the HLR 26 and places the call. Additional PSTN calls are then made, if necessary, according to the best-chance protocol of that list.

Shown in FIG. 3 are representative examples of the contents of various lists in accordance with the aforesaid description. List (a) corresponding to Location Area A in FIG. 2, i.e., the home area, contains PSTN numbers associated with home, e.g., home telephone lines 1 and 2. List (b), corresponding to intermediate Location Area B, contains line 1 of home, direct number at work, and voice mail. List (c), corresponding to Location Area C, i.e., work, contains the direct line at work, general number at work and voice mail. List (d), corresponding to other location areas, contains the general number at work, line 1 at home and voice mail. It should, of course, be understood that the aforedescribed list contents are exemplary only and other selections and orderings are possible in accordance with the subscriber's preferences, system selections and combinations thereof.

It should also be understood that the above embodiment of the present invention may be adapted for use in other systems, such as in an Intelligent Network (IN). Shown in FIG. 4 is a second embodiment of the present invention directed to incorporating best-chance routing capability into an IN system. Instead of the HLR 26 forwarding the appropriate list of potential PSTN contact numbers to the MSC 14, a Service Control Point (SCP) 30 forwards the appropriate list, in accordance with an Advanced Intelligent Network (AIN) protocol or other Intelligent Network, to the MSC 14 through a Service Switching Point (SSP) 28 therebetween.

It should, of course, be understood that the aforedescribed cellular communications system operates substantially coterminously with the PSTN, i.e., the wireless system overlays the wireline network. It should further be understood, however, that the alternate numbers may include not only PSTN or other public numbers but also numbers within the same or another cellular system.

The previous description is of preferred embodiments for implementing the invention, and the scope of the invention should not necessarily be limited by this description. The scope of the present invention is instead defined by the following claims.

What is claimed is:

1. In a cellular communications system having a location register and a plurality of mobile switching centers in communication therewith, a subscriber within said cellular communications system having a cellular number therein and a multiplicity of alternate numbers, circuitry within said location register and said mobile switching centers for selectively routing an incoming call to said subscriber within the cellular communications system to at least one of said alternate numbers when said subscriber fails to respond at said cellular number, said circuitry comprising:

a database within said location register for storing a multiplicity of lists for said subscriber, each of said lists containing a plurality of said alternate numbers therein, each of said lists corresponding to a respective location of said subscriber within said cellular communications system, the list of alternative numbers corresponding to the last known subscriber location being forwarded to at least one of said mobile switching centers, and said at least one mobile switching center contacting said subscriber through one of said alternate numbers within said list.

2. The cellular communications system according to claim 1, wherein at least one of said alternate numbers is to a public network substantially coterminous with said cellular communications system.

3. The cellular communications system according to claim 2, wherein said public network is a Public Land Mobile Network.

4. The cellular communications system according to claim 1, wherein said corresponding list forwarded to said at least one mobile switching center corresponds to the last known Service Area location of said subscriber within said cellular communications system.

5. The cellular communications system according to claim 1, wherein said corresponding list forwarded to said at least one mobile switching center corresponds to the last known Location Area location of said subscriber within said cellular communications system.

6. The cellular communications system according to claim 1, wherein said corresponding list forwarded to said at least one mobile switching center corresponds to the last known cell location of said subscriber within said cellular communications system.

7. The cellular communications system according to claim 1, wherein said database is within a home location register.

8. The cellular communications system according to claim 1, wherein said database is within a service control point within an intelligent network.

9. The cellular communications system according to claim 1, wherein one of said multiplicity of lists for said subscriber corresponds to a home location for said subscriber, and at least one of said plurality of alternate numbers within said one list corresponds to a home telephone number.

10. The cellular communications system according to claim 9, wherein another of said plurality of alternate numbers within said one list corresponds to a work telephone number.

11. The cellular communication system according to claim 1, wherein one of said multiplicity of lists for said subscriber corresponds to a work location for said subscriber, and at least one of said plurality of alternate numbers within said list corresponds to a work telephone number.

12. A method for selectively routing an incoming call to a subscriber in a cellular communications system including a location register and a plurality of mobile switching centers in communication therewith, said subscriber having a cellular number within said cellular communications system, said location register containing a multiplicity of lists for said subscriber, each of said lists containing a plurality of alternate numbers therein, each of said lists corresponding to a respective location of said subscriber within said cellular communications system, where said incoming call is routed to a respective one of said alternate numbers when said subscriber fails to respond at said cellular number, said method comprising the steps of:

determining, within said location register, the last known location of said subscriber within said cellular communications system, and the respective list corresponding to said last known location;

forwarding said corresponding list from said location register to a given one of said mobile switching centers; and contacting said subscriber through said given mobile switching center at one of said alternate numbers within said corresponding list.

13. The selective routing method according to claim 12, wherein said corresponding list contains a multiplicity of alternate numbers, said multiplicity of numbers being ordered within said corresponding list, and wherein said step of contacting comprises calling said subscriber at a plurality of said alternate numbers, the order of calling determined by the order of said multiplicity of numbers within said corresponding list, said step of calling terminating upon contact with said subscriber.

14. The selection routing method according to claim 12, wherein at least two of said lists for said subscriber are different.

* * * * *